(12) United States Patent
Armbruster

(10) Patent No.: US 11,472,076 B2
(45) Date of Patent: Oct. 18, 2022

(54) INJECTION MOLDING DEVICE

(71) Applicant: FOBOHA (GERMANY) GMBH, Haslach (DE)

(72) Inventor: Rainer Armbruster, Wolfach (DE)

(73) Assignee: FOBOHA (GERMANY) GMBH, Haslach (CH)

( * ) Notice: Subject to any disclaimer, the term of this patent is extended or adjusted under 35 U.S.C. 154(b) by 115 days.

(21) Appl. No.: 16/964,400

(22) PCT Filed: Nov. 16, 2018

(86) PCT No.: PCT/EP2018/081604
§ 371 (c)(1),
(2) Date: Jul. 23, 2020

(87) PCT Pub. No.: WO2019/145062
PCT Pub. Date: Aug. 1, 2019

(65) Prior Publication Data
US 2021/0046681 A1    Feb. 18, 2021

(30) Foreign Application Priority Data

Jan. 23, 2018   (CH) ....................................... 0079/18
Feb. 7, 2018    (CH) ..................................... 00139/18

(51) Int. Cl.
B29C 45/14       (2006.01)
B29C 45/04       (2006.01)
(Continued)

(52) U.S. Cl.
CPC ...... *B29C 45/045* (2013.01); *B29C 45/14008* (2013.01); *B29C 45/14073* (2013.01);
(Continued)

(58) Field of Classification Search
CPC ............ B29C 45/045; B29C 45/14008; B29C 45/162; B29C 45/1628; B29C 45/33
See application file for complete search history.

(56) References Cited

U.S. PATENT DOCUMENTS 3,266,100 A    8/1966  Belander
8,360,764 B2 *  1/2013  Armbruster ......... B29C 45/1628
                                                                 264/255
(Continued)

FOREIGN PATENT DOCUMENTS

CN        1914017 A      2/2007
CN      101370635 A      2/2009
(Continued)

OTHER PUBLICATIONS

EPO (Riswijk, NL), English language version of the International Search Report, Form PCT/ISA/210, for International Application PCT/EP2018/081604, dated Mar. 4, 2019 (3 pages).
(Continued)

*Primary Examiner* — Edmund H Lee
(74) *Attorney, Agent, or Firm* — Pauley Erickson & Swanson

(57) ABSTRACT

An injection molding device for producing a multicomponent injection molded product includes at least one first and at least one second outer mold plate arranged in a movable manner between an open position and a closed position. A central part arranged between the first and the second outer mold plate includes a first part which in the open position is arranged rotatable about an axis of rotation and to which first inner mold plates are attached which include first cavity segments. A second part arranged non-rotatable includes on one side in the direction of the first outer mold plate second cavity segments and on an opposite side in the direction of the second outer mold plate third cavity segments. Second inner mold plates clamp related intermediate products and in
(Continued)

the open position are arranged displaceable in a radial direction with respect to the axis of rotation and rotatable around the second part to transport the intermediate products from the second cavity segments to the third cavity segments around the second part of the central part.

11 Claims, 3 Drawing Sheets

(51) Int. Cl.
    *B29C 45/16*     (2006.01)
    *B29C 45/32*     (2006.01)
    *B29C 45/33*     (2006.01)
    *B29C 45/44*     (2006.01)
    *B29L 31/54*     (2006.01)

(52) U.S. Cl.
CPC ...... *B29C 45/14819* (2013.01); *B29C 45/162* (2013.01); *B29C 45/1628* (2013.01); *B29C 45/1671* (2013.01); *B29C 45/32* (2013.01); *B29C 45/33* (2013.01); *B29C 45/44* (2013.01); *B29C 2045/1621* (2013.01); *B29L 2031/546* (2013.01)

(56) References Cited

U.S. PATENT DOCUMENTS

| | | | |
|---|---|---|---|
| 9,931,772 | B2 | 4/2018 | Armbruster |
| 2002/0086074 | A1 | 7/2002 | Lavallee |
| 2003/0054902 | A1 | 3/2003 | Masutani |
| 2003/0067088 | A1 | 4/2003 | Scolamiero et al. |
| 2003/0067093 | A1 | 4/2003 | Brum |
| 2006/0273485 | A1 | 12/2006 | Higuchi et al. |
| 2008/0296802 | A1 | 12/2008 | Wachi |
| 2012/0119403 | A1 | 5/2012 | Kariya |
| 2016/0263786 | A1 | 9/2016 | Kong |
| 2018/0001524 | A1 | 1/2018 | Matsuda |
| 2018/0021999 | A1 | 1/2018 | Armbruster |
| 2021/0046682 | A1 | 2/2021 | Armbruster |

FOREIGN PATENT DOCUMENTS

| | | |
|---|---|---|
| CN | 101508161 A | 8/2009 |
| CN | 101898401 A | 12/2010 |
| CN | 102085710 A | 6/2011 |
| CN | 103072239 A | 5/2013 |
| CN | 104526980 A | 4/2015 |
| CN | 105263690 A | 1/2016 |
| CN | 105382998 A | 3/2016 |
| CN | 106457632 A | 2/2017 |
| DE | 2 065 568 A1 | 6/1974 |
| DE | 24 22 669 A1 | 11/1975 |
| DE | 101 21 691 A1 | 11/2002 |
| DE | 10 2005 017 222 A1 | 10/2006 |
| EP | 0 070 189 A1 | 1/1983 |
| EP | 1 035 959 A1 | 9/2000 |
| EP | 1 155 802 A2 | 11/2001 |
| EP | 1 174 242 A2 | 1/2002 |
| EP | 1 428 645 A1 | 6/2004 |
| EP | 1 725 386 | 11/2006 |
| EP | 1 782 936 A2 | 5/2007 |
| EP | 2 883 675 A1 | 6/2015 |
| FR | 2 596 693 A1 | 10/1987 |
| GB | 2278801 A | 12/1994 |
| JP | S6397181 A | 4/1988 |
| JP | H0343224 A | 2/1991 |
| WO | WO 99/28108 | 6/1999 |
| WO | WO 2005/077637 A1 | 8/2005 |
| WO | WO 2007/082394 A1 | 7/2007 |
| WO | WO 2007/085063 A1 | 8/2007 |
| WO | WO 2013/001022 A1 | 1/2013 |
| WO | WO 2015/158702 A1 | 10/2015 |

OTHER PUBLICATIONS

Chinese Patent Office (CNIPO), Beijing, P.R. China, First Office Action for Chinese Application No. 201880087481.0, dated Aug. 3, 2021(4 pages).
Chinese Patent Office (CNIPO), Beijing, P.R. China, Search Report for Chinese Application No. 201880087481.0, dated Jul. 23, 2021 (4 pages).

* cited by examiner

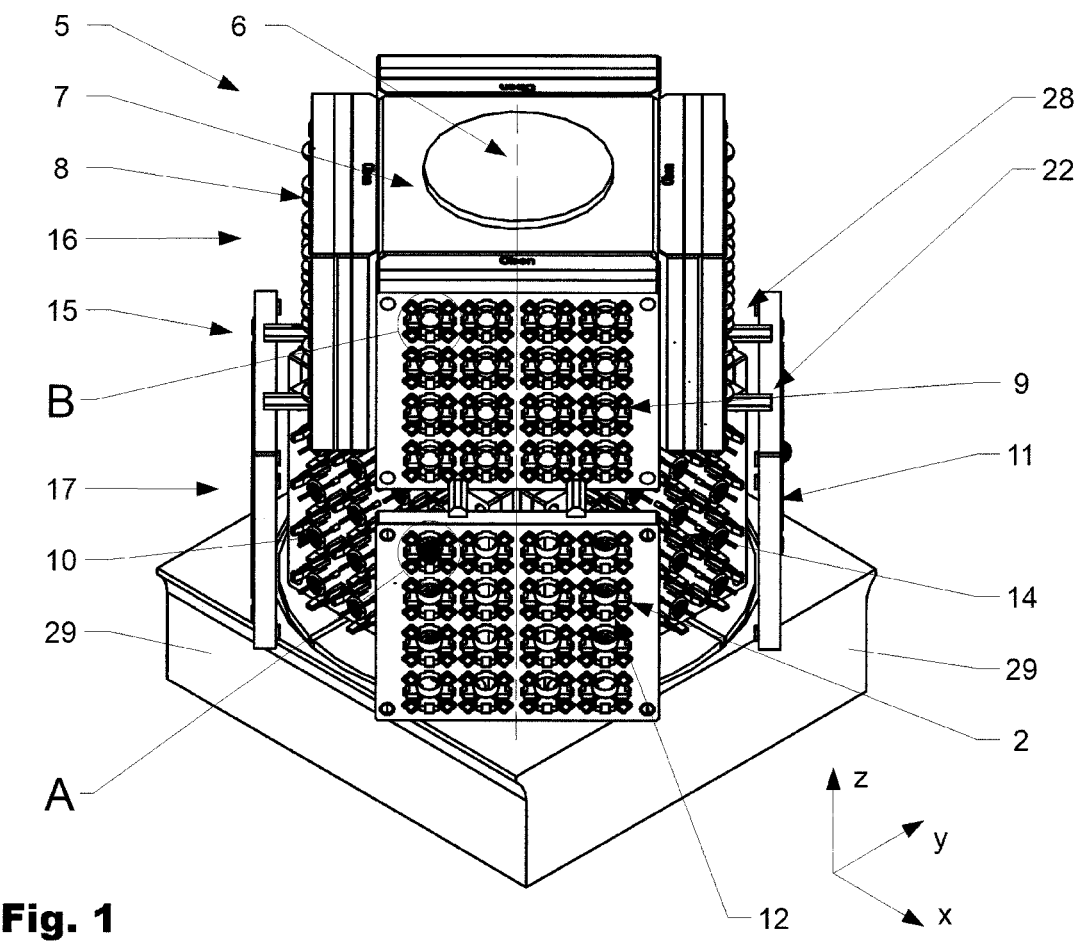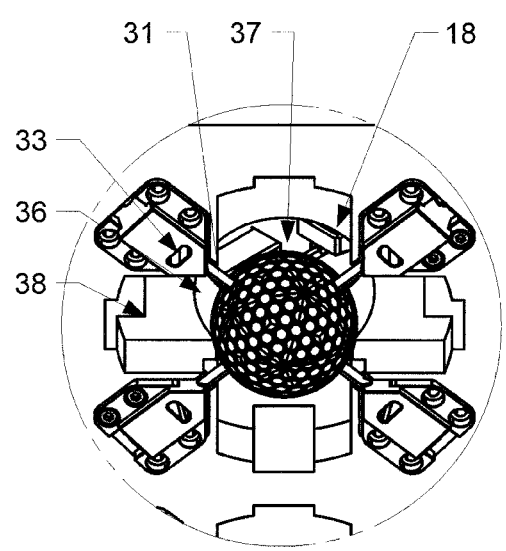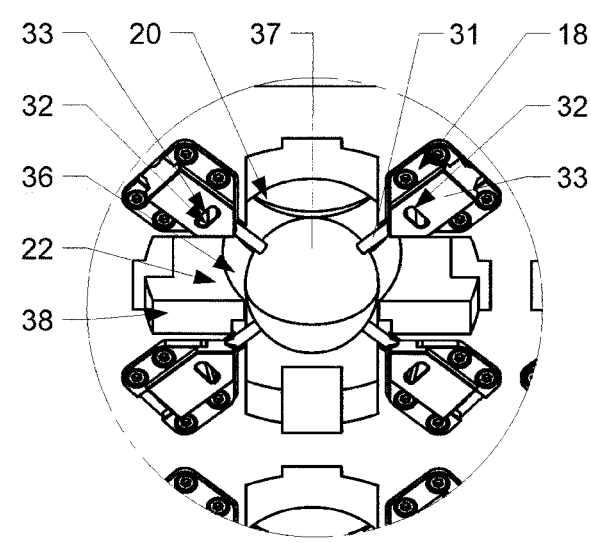
Fig. 1
Fig. 2
Fig. 3

INJECTION MOLDING DEVICE

BACKGROUND OF THE INVENTION

Field of the Invention

The present invention applies to the field of tools and machines for injection molding of plastics and other thermoplastic materials.

Discussion of Related Art

Injection molding devices having one or more rotating mold central parts are known from the prior art, which are used to efficiently produce multi-component plastic parts through injection molding. At least one rotatable mold central part, which is fixed to a holding device and is arranged so as to be able to rotate about a rotation axis, is arranged between a first mold half and a second mold half that are movable relative to one another along tie bars of an injection molding machine in a first direction. The rotatable mold central part has at least two parallel side surfaces, along which it interacts with the first and the second outer mold plate to form cavities suitable to receive plasticized plastic material through an injection nozzle. In certain embodiments, the rotatable mold central part may interact at least on one side with a further rotatable mold central part. Coordination means cause the rotatable mold central part to remain positioned centrally between the first and the second mold half during opening and closing, and thus collisions can be avoided. A variety of holding devices for the rotatable central part are known from the prior art.

EP1035959 and EP1155802 were published in 1999 by the same applicant, and both relate to a holding device for a rotatable central part (mold, mold half, mold carrier). The holding device has a lower and an upper cross member which are guided along the bars of an injection molding machine. Each cross member of the holding device has a rotatable holding means, which serves to releasably clamp the mold, mold half, or mold carrier therebetween.

EP1725386 of the same applicant was published in 2005, and relates to a method and an injection molding device with more than one rotatable central part. This makes it possible to manufacture parts in two outer parting planes and to assemble these in a further parting plane in a further manufacturing step. In the figures, different embodiments of holding devices for the rotatable central parts are illustrated.

WO2013001022 by the same applicant was published in 2013 and describes a holding device for a rotatable central part. The central part is mounted on a non-rotatably arranged column having supply channels in the interior.

EP0070189 was published in 1984 by Sumitomo Heavy Industries and relates to an injection blow-molding device having a non-rotatably arranged central part. A transfer system is rotatably mounted onto the central part above and below. The transfer system is used to move parts produced by injection molding in a first parting plane into a second parting plane where the parts are then reshaped by blow molding. The transfer system is a part of the injection molding device and remains within the interior thereof during the production of the parts when the device is closed.

EP1174242 was published in 2002 by the company Hekuma GmbH and discloses an injection molding device of the aforementioned type, comprising a transfer device that is arranged on the exterior and comes in between the two parting planes from the outside.

DE10121691 was published in 2002 by the company Zahoransky Formenbau GmbH, and describes an injection molding device of the aforementioned type. The transfer system is based on a chain drive that is arranged around the central mold halves and has two chains that rotate about two rotational axes and move the parts in parallel to the side surfaces of the central mold halves, both comprising cavity segments. The chains are arranged in two slots that are arranged in parallel. The parts produced remain stuck in a movable region of the cavities during transfer, the movable region being fastened to a lifting system.

EP1782936 was published in May of 2007 by the company Wilden Handels AG, and discloses and injection molding device of the aforementioned type. The central mold halves are composed of a lower part and an upper part that are separated from one another by a slot. Arranged in this slot is a transfer system that is used to transfer the parts from a first parting plane into a second parting plane. The transfer system rotates about a single axis. No details are known about the structure of the injection molding device.

WO07082394 was published in July of 2007 by the same applicant, and also discloses an injection molding device of the aforementioned type with a central mold half and a transfer system integrated in the mold. The central mold halves have a lower part and an upper part that are separated from one another by a slot. The transfer system rotates about a centrally arranged rotation axis. Regions of the cavities are fastened to radially adjustable cantilever arms that are arranged in the slot between the lower part and the upper part.

WO07085063 was published in August of 2007 by the company Boucherie NV G B, and is directed to an injection molding device of the aforementioned type. The device described in this publication is very similar in its construction of the transfer system to the one in EP0070189. Both include a transfer system that is rotatably fixed to the central mold half at the bottom and at the top.

WO15158702 was published in October 2015 in the name of the same applicant. It is directed to an injection molding device with at a first and a second outer mold plate, which are arranged in a movable manner relative to each other in a first direction. A central part can be rotated about a rotation axis is arranged between the two mold halves, said central part having an upper part and a lower part. Inner mold halves interact with the in a closed position thereto assigned first and second outer mold plates in order to form cavities. The first and the second inner mold halves and the assigned first and second outer mold plates form a lower and an upper production plane.

SUMMARY OF THE INVENTION

The present invention addresses the problem of providing an injection molding device that enables efficient and flexible production of complex parts, if required, parts comprising undercuts in at least one component.

An injection molding device according to the invention is suitable for the efficient production of a multi component, respectively multi layered injection molded product comprising several components (layers) of the same or a different material and/or color. In a variation the injection molding device comprises at least one first and at least one second outer mold plate, which are arranged in a movable manner relative to each other in a first direction between an open position and a closed position of the injection molding device. The first and the second outer mold plate are normally attached to a first and a second mold holding plate of an injection molding machine. A central part is arranged between the first and the second outer mold plate and comprises a first part which in the open position is arranged rotatable about an axis of rotation and to which first inner mold plates are attached, comprising at least part of first cavity segments. The first inner mold plates are normally arranged in pairs opposite to each other with respect to the axis or rotation. Good results can be achieved when four first mold plates are arranged in circumferential direction with respect to the axis of rotation, equally spaced apart by 90° with respect to each other. The same applies to the second inner mold plates described hereinafter. A second part is arranged coaxially to the first part. The second part is normally arranged non-rotatable. It comprises on a first side face, in the direction of the first outer mold plate, second cavity segments and on an opposite second side face, in the direction of the second outer mold plate, third cavity segments. In addition, second inner mold plates are present, which during production interact with the second and the third cavity segments arranged at the second part. The second inner mold plates preferably comprise, per thereto related cavity, a clamping means for clamping of a intermediate product produced in the related cavities as described hereinafter in more detail. In the open position of the injection molding device the second mold plates are displaceable in a radial direction with respect to the axis of rotation away from the first and the second side face from an inner to an outer position. Furthermore when moved away from the first and the second side face, the second inner mold plates are rotatable about the axis of rotation around the second part to transport the intermediate products from the second cavity segments to the third cavity segments. If appropriate the second inner mold plates can be directly or indirectly supported on a base which also supports the center part.

In a preferred variation the first part (upper part) is arranged above the second part (lower part). The first and/or the second side face of the second part which interact with the second, respectively the third cavity segments may comprise means to operate a slider system arranged at the first and/or second outer mold plate and/or a clamping means arranged at the second inner mold plate as describe herein after in more detail.

The first inner mold plates may comprise clamping means suitable to receive and temporarily hold a component inserted from the outside face, e.g. by a handling system. Alternatively or in addition, the second inner mold plates may comprise clamping means suitable to receive and temporarily hold a first intermediate product. Good results can be achieved when the clamping means comprises at least one pin, if appropriate, arranged displaceable with respect to a wall of a respective cavity. The at least one pin can be arranged displaceable, depending on the molding pressure in the respective cavity. E.g. when the molding pressure achieves a certain value, the pin moves from an inner to an outer position. In a preferred variation a clamping means is arranged in an opening of an inner mold plate. The second inner mold plate may comprise at least one opening in which at least one clamping means is arranged. The opening preferably extends across second inner mold plate. At least one of the inner and/or the outer mold plates may comprises at least one slide displaceable in a lateral direction with respect to the first direction. If appropriate, in the closed position of the injection molding device at least one slide may encompass a pin of a clamping means at least partially. The first and/or the second inner mold plates, displaceable with respect to the axis of rotation in a radial direction, are preferably attached to a guiding means which supports and guides the respective mold plates. Good results can be achieved when the central part is supported by a base, which is supported on a machine bed of the injection molding machine by rails.

If present, the slider systems preferably comprises slides which are displaceable in a plane arranged perpendicular to the direction of movement of the first and/or the second outer of the mold plate. The slides form on the inside at least part of a cavity suitable to receive plasticized material during an injection molding process. Good results can be achieved when the slider system, respectively the slides, are build according to the invention described in the Swiss Patent Application No. 00079/18 filed on 23 Jan. 2018, which is hereby incorporated by reference in this application. Depending on the field of application, other cavity design is possible. If no undercut is present, it is possible to avoid sliders systems as described above.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

FIG. 1 shows the Central part of an injection molding device;

FIG. 2 shows detail A of FIG. 1;

FIG. 3 shows detail B of FIG. 2;

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

FIG. 1 and FIG. 4 through FIG. 6 are showing a variation of the injection molding device 1 in a perspective view. FIG. 2 is showing detail A of FIG. 1 and FIG. 3 is showing detail B of FIG. 1. FIG. 7 is showing detail C of FIG. 6.

The injection molding device 1 can be used for the production of complex injection molded products 2, e.g. such as golf balls, comprising several layers and components of material. The shown variation of the injection molding device 1 comprises at least one first and at least one second outer mold plate 3, 4, which are arranged in a movable manner relative to each other in a first direction (x-direction) between an open (see FIG. 5) and a closed position (see FIG. 4). In FIGS. 5 and 6 the injection molding device 1 is shown in the open position wherein the first and the second outer mold plate 3, 4 are arranged at a distance from the central part 5 arranged there between.

Figure 4:
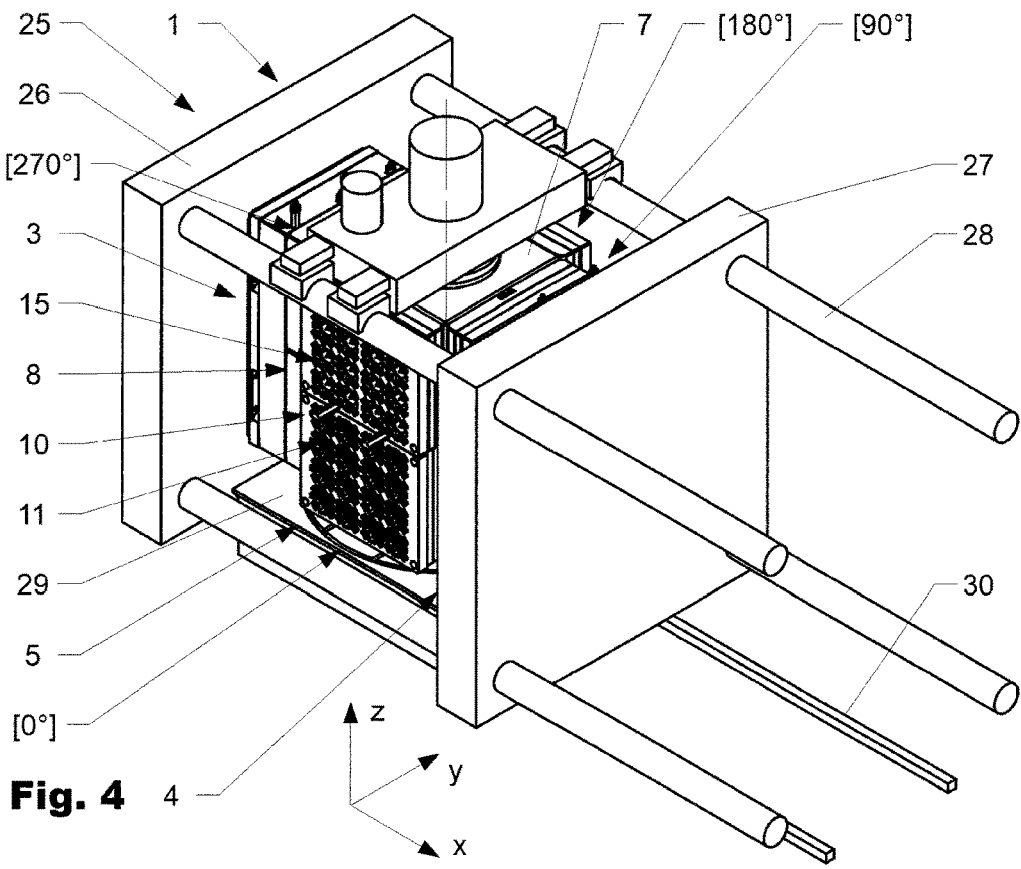
FIG. 4 shows the injection molding device in a closed position.
Figure 5:
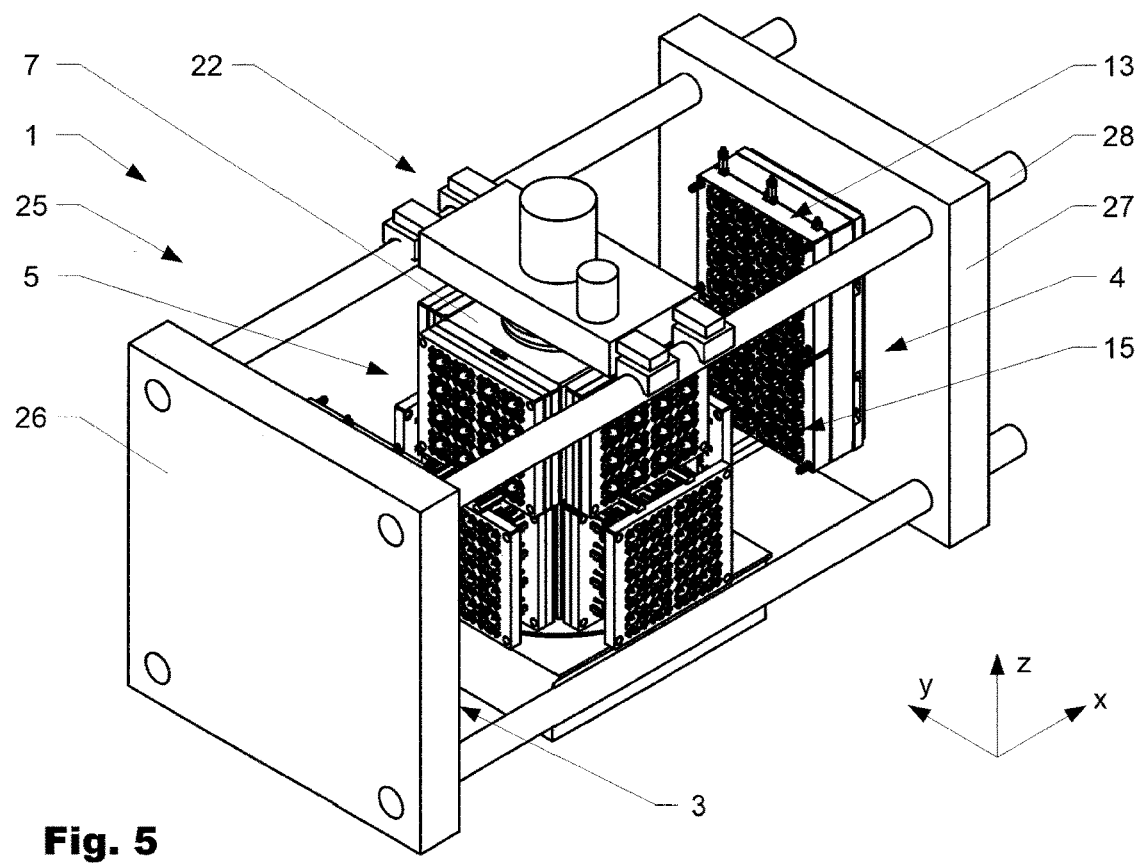
FIG. 5 shows the injection molding device in a first open position.
Figure 6:
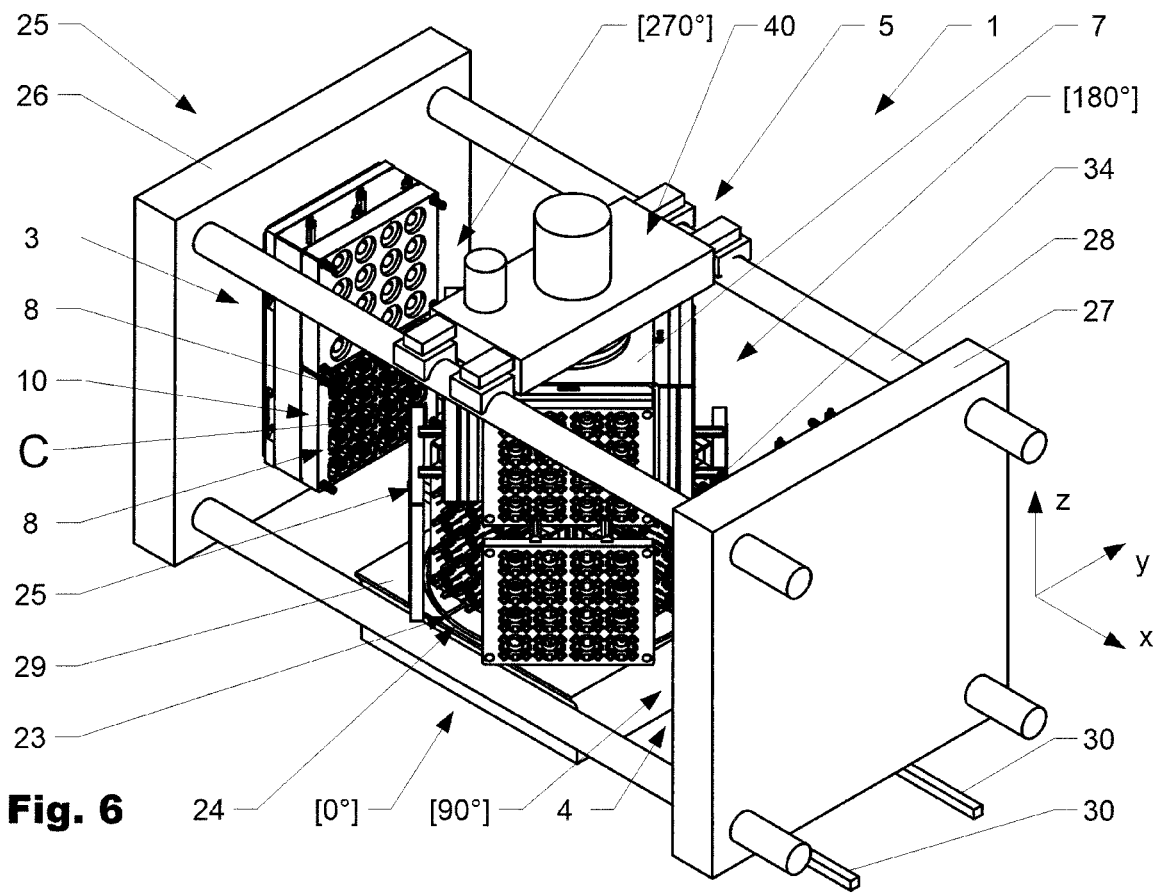
FIG. 6 shows the injection molding device in a second open position
Figure 7:
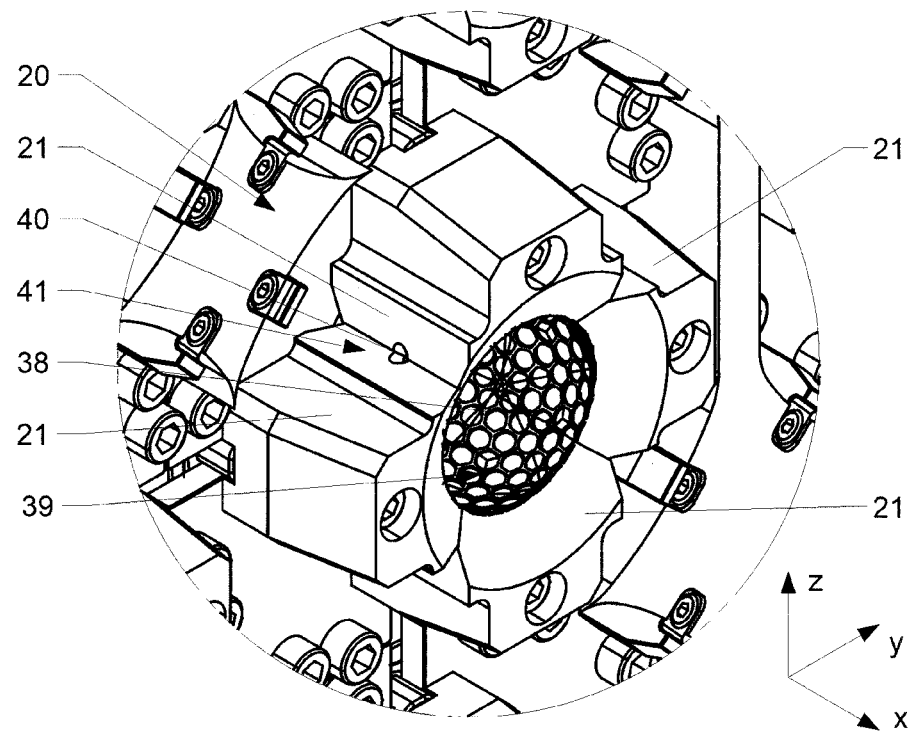
FIG. 7 shows detail C according to FIG. 6.

As can be seen in FIGS. 4 through 6, the central part 5 is arranged between the first and the second outer mold plate 3, 4 in an injection molding machine 25 comprising a stationary first holding plate 26, to which the first outer mold plate 3 is attached. The injection molding machine 25 further comprises a, with respect to the first holding plate 26, along tie rods 28 (in x-direction) displaceable second holding plate 27. The injection molding machine 25 is shown in a simplified manner, without e.g. injection units, pressure cylinders, etc. The central part 5 comprises an upper part 7 and a lower part 10, which are, depending on the field of application, independent or in combination rotatable about an axis of rotation 6 (z-direction).

Four first inner mold plates 8, comprising at least part of first inner cavity segments 9, are interconnected in pairs (with respect to the rotation axis 6) to the upper part 7. Four second inner mold plates 11, comprising at least part of second inner cavity segments 12, are interconnected in pairs (with respect to the axis of rotation 6) to the lower part 10. The first upper and the second lower part 10 are arranged on a base 29 which forms part of the central part 5. The base 29 is arranged displaceable in the direction of the tie rods 28. As visible in the FIGS. 4 through 6 the base 29 is supported on rails 30 supported by a machine bed (not shown in detail) of the injection molding machine 25. At the first and the second part 7, 10 are guided with respect to the tie rods 28 by a yoke 42 which acts as a pivot bearing at least for the upper first part 7 of the central part 5. The yoke 42 and the base 29 act as a holding device for the central part 5.

The first and said second inner cavity segments 9, 12 interact in the closed position (not shown in detail) of the injection molding device 1, with first, respectively second outer cavity segments 13, 14 arranged at the first and the second outer mold plates 3, 4 to form in the closed position of the injection molding device 1 several types of cavities in an upper production level 16 and a lower production level 17. In the shown variation the second inner mold plates 11 of the lower production level 17 are arranged displaceable with respect to the axis of rotation 6 in a radial direction. The four second inner mold plates 11 are each arranged at an offset slide 23, by which they can be displaced linearly in the radial direction between in an inner and an outer position. The offset slide 23 is interconnected to a turning device 24 by which the second inner mold plates 11 in the outer position can be rotated around the lower part 10 which is in the shown variation non-rotatable. In difference to the lower part 10, the upper part 7 is arranged rotatable around the rotation axis 6. In the shown variation the upper part 7 rotates simultaneously with the offset slide 23 and the thereto interconnected second inner mold plates 11. The offset slide 23 of the shown variation comprises an upper slide 23.1 and a lower slide 23.2 which results in a very robust construction. Depending on the field of application, other variations are possible.

Depending on the field of application the upper part 7 and/or the lower part 10 can be arranged non-rotatable while the thereto interconnected first, respectively second inner mold plates 9, 11 can be arranged rotatable with respect to the axis of rotation 6 around the related upper, respectively lower part 7, 10. In a preferred variation the first and the second mold plates 9, 11 are arranged rotating simultaneously around their axis of rotation 6. Depending on the product to be made, the first and/or the second inner cavity segments 9, 12 can comprise a clamping means 18 arranged therein to temporarily clamp a component 19 (see FIG. 3) inserted from the outside into the first and/or the second inner cavity segments 9, 12. The component 19 can be inserted most efficiently in all cavities to be supplied by a handling device, e.g. a robot (not shown in detail). Details of a production process are described hereinafter in more detail. The handling device is preferably arranged laterally to the injection molding device 1. The components 19 are preferably inserted into the respective clamping means 18 of the upper and/or the lower production level 16, 17 when the injection molding device 1 is in its closed position. Due the prismatic design of the central part 5 the respective side face is accessible from the outside.

In the shown variation, the clamping means 18 comprise at least one pin 31 arranged displaceable with respect to a wall 38 of the first and/or the second inner cavity segments 9, 12 against the force of a spring 32 in a housing 33 of the clamping means 18. The pins 31 can be opened be actuating wedges 34 which in the shown variation interact with the pin 31 via actuating surfaces 35 which cause a displacement of the related pin 31 when the actuating wedge 34 presses against them. In addition, the at least one pin 31 can be arranged displaceable depending on the pressure in the cavity during production.

As best visible in FIG. 7 the first and the second outer mold plates 3, 4 comprise slider systems 20 with slides 21 displaceable in a plane (here yz-plane) of the mold plate laterally with respect to the first direction x. The slides 21 on the inside form at least part of a cavity suitable to receive plasticized material during an injection molding process. Good results can be achieved when the slider system 20, respectively the slides 21 are build according to the invention described in the Swiss Patent Application No. 00079/18 filed on 23 Jan. 2018, which is hereby incorporated by reference in this application. Depending on the filed of application other cavity design is possible. If no undercut is present, it is possible to avoid sliders systems 20 as described above.

In the closed position of the injection molding device 1 the slides encompass the pins 31 at least partially. The pins 31 are arranged at 90° with respect to each other. The slides 21 are also arranged at an angle of 90° with respect to each other but with respect to the pins offset by 45°. The slides 21 comprise holes 40 arranged in joint faces 41 between two neighboring slides 21. The holes 40 are foreseen to receive and tightly encompass the pins 31 in a closed position of the injection molding device 1.

A typical process for the production of a complex injection molded product comprises the following process steps:

(a) When the molding device 1 is closed (see FIG. 4) inserting by a handling system (not shown in detail) components 19 into first cavity segments 9 of a first inner mold plate 8 in a first (upper) production level 16 at 0° position. The components 19 are preferably clamped by the pins 31 of a clamping means 18 in the center of the cavities 15 (see FIG. 3).

(b) Opening the injection molding device 1 (see FIG. 5) by moving the first and the second outer mold half 3, 4 apart from each other, away from the central part 5 arranged there between in a center position.

(c) Linearly displace the second inner mold plates 11 in a radial direction away from the side faces with respect to the rotation axis 6 from an inner (see FIG. 4) into an outer position (see FIG. 5).

(d) Rotate the upper part 7 with the thereto attached first inner mold plates 8 together with the second outer mold plates 11 held by the guiding means 22 in a counter clock direction about the rotation axis 6 by an angle of 90° to a 90° position.

(e) Linearly displace the second inner mold plates 11 from the outer position into the inner position thereby bringing the external component into a first cavity type formed between the first inner mold plates 8 and the second outer mold plate 4.

(f) Injection molding a first layer of material onto the external component, forming a closed surface around the external component by retracting the pins 31 in a holding pressure phase, resulting in a first intermediate product.

(g) After sufficient curing of the first material component, opening of the injection molding device 1 as described above and rotating the first and the second inner mold plates 8, 11 by another 90° around the axis of rotation 6 to a 180° position. The first intermediate product thereby remaining in the first inner cavity segments 9 arranged at the upper part 7 of the central part 5.

(h) By a handling device (not shown in detail), which is preferably arranged laterally to the injection molding device 1 next to the 180° position, moving the first intermediate products from the upper production level into corresponding second inner cavity segments 12 arranged at the second inner mold plates in the lower production level 17. The intermediate products are held by a clamping means 18 arranged in the second inner cavity segments 12 (see FIG. 2).

(i) Rotating the first and the second inner mold plates 8, 11 by another 90° around the axis of rotation 6 to a 270° position.

(j) After closing of the injection molding device (1) the intermediate products are arranged in a second cavity type formed by the second inner cavity segments 12 of the second inner mold plates 11 and the second outer cavity segments 14 of the first outer mold plate 3.

(k) Injection molding of a second layer of material onto the first layer of material, forming a closed surface around the first intermediate product by retracting the pins 31 in a holding pressure phase, resulting in a second intermediate product.

(l) Rotating the second inner mold plates by another two times 90° steps such that the thereto attached second intermediate product is introduced into a third cavity type formed third cavity segments 15 arranged at the lower part 10 and the lower part of the second outer mold plate 4.

(m) Injecting molding of third material component onto an outer surface of the second intermediate product forming a final product.

(n) Opening the injection molding device and removing the final product.

Rather, the words used in the specification are words of description rather than limitation, and it is understood that various changes may be made without departing from the spirit and scope of the invention.

The invention claimed is:

1. An injection molding device (1) for the production of a multi component injection molded product (2), the injection molding device (1) comprising:
   a. at least one first outer mold plate (3) and at least one second outer mold plate (4), which are arranged in a movable manner relative to each other in a first direction (x) between an open position and a closed position of the injection molding device (1), and
   b. a central part (5) arranged between the first outer mold plate (3) and the second outer mold plate (4), the central part (5) comprises
      i. a first part (7) which in the open position is arranged rotatable about an axis of rotation (6) and to which first inner mold plates (8) are attached, comprising at least part of a first cavity segment (9), and
      ii. a second part (10) arranged non-rotatable comprising on one side in the direction of the first outer mold plate (3) second cavity segments (14) and on an opposite side in the direction of the second outer mold plate (4) third cavity segments (15), and
      iii. second inner mold plates (11), comprising at least one clamping means (18) for clamping of thereto related intermediate product, wherein the second inner mold plates (11) are in the open position arranged displaceable in a radial direction with respect to the axis of rotation (6) and rotatable about the axis or rotation (6) around the second part (10) to transport the intermediate products from the second cavity segments (14) to the third cavity segments (15).

2. The injection molding device (1) according to claim 1, wherein the first inner mold plates (8) comprise at least one clamping means (18) suitable to receive and temporarily hold a component (19) inserted from the outside.

3. The injection molding device (1) according to claim 1, wherein the at least one clamping means (18) comprises at least one pin (31) to clamp.

4. The injection molding device (1) according to claim 3, wherein the at least one pin (31) is arranged displaceable depending on the molding pressure in a thereto related cavity (13, 14, 15).

5. The injection molding device (1) according to claim 2, wherein at least one clamping means is arranged in an opening (36) of an inner mold plate (9, 11).

6. The injection molding device (1) according to claim 1, wherein at least one of the inner and/or the outer mold plates (3, 4, 8, 11) comprises at least one slider system (20) comprising a slide (21) displaceable in a lateral direction with respect to the first direction (x).

7. The injection molding device (1) according to claim 6, wherein in the closed position of the injection molding device (1) at least one slide (21) encompasses a pin (31) of a clamping means (18) at least partially.

8. The injection molding device (1) according to claim 1, wherein the first and/or the second inner mold plates (8, 11), displaceable with respect to the axis of rotation (6) in a radial direction, are attached to a guiding means (22).

9. The injection molding device (1) according to claim 1, wherein the central part (5) is supported by a base (29).

10. The injection molding device (1) according to claim 1, wherein the base (29) is supported on a machine bed of the injection molding machine (25) by rails (30).

11. A process for the production of a complex injection molded product by injection molding, comprising the following process steps:
   a. inserting by a handling system components (19) into first cavity segments (9) of a first inner mold plate (8)

of a first part (7) of a central part (5) of an injection molding device (1) in a first production level (16) at a 0° position;

b. after step a, opening the injection molding device (1) by moving a first outer mold half (3) and a second outer mold half (4) apart from each other, away from the central part (5) arranged there between in a center position;

c. after step b, linearly displacing second inner mold plates (11) in a radial direction away from thereto related side faces of a second part (5) of the central part (5) with respect to a rotation axis (6) from an inner into an outer position;

d. after step c, rotating the first part (7) with the thereto attached first inner mold plates (8) together with the second outer mold plates (11) held by a guiding means (22) in a first direction about the axis of rotation (6) by an angle of 90° to a 90° position;

e. after step d, linearly displacing the second inner mold plates (11) from the outer position into the inner position thereby bringing the external component into a first cavity type formed between the first inner mold plates (8) and the second outer mold plate (4) by first cavity segments;

f. after step e, injection molding a first layer of material onto the external component resulting in a first intermediate product;

g. after sufficient curing of the first material component, opening of the injection molding device (1) and rotating the first and the second inner mold plates (8, 11) by another 90° around the axis of rotation (6) to a 180° position, the first intermediate product thereby remaining in the first inner cavity segments (9) arranged at the upper part (7) of the central part (5);

h. after step g, by a handling device moving the first intermediate products from the upper production level (16) into corresponding second inner cavity segments (12) arranged at the second inner mold plates (11) in a lower production level (17);

i. after step h, rotating the first and the second inner mold plates (8, 11) by another 90° around the axis of rotation (6) to a 270° position;

j. after step i, after closing of the injection molding device (1) the intermediate products are arranged in a second cavity type formed by second inner cavity segments (12) of the second inner mold plates (11) and the second outer cavity segments (14) of the first outer mold plate (3);

k. after step j, injection molding of a second layer of material onto the first layer of material, resulting in a second intermediate product;

l. after step k, rotating the second inner mold plates (11) by another two times 90° steps such that the thereto attached second intermediate product is introduced into a third cavity type formed third cavity segments (15) arranged at the lower part (10) and the lower part of the second outer mold plate (4);

m. after step l, injection molding of third material component onto an outer surface of the second intermediate product forming a final product; and n. after step m, opening the injection molding device (1) and removing the final product.

* * * * *